United States Patent
Ivanovic

(10) Patent No.: US 10,740,306 B1
(45) Date of Patent: Aug. 11, 2020

(54) LARGE OBJECT PARTITIONING SYSTEM

(71) Applicant: Amazon Technologies, Inc., Seattle, WA (US)

(72) Inventor: Zoran Ivanovic, Toronto (CA)

(73) Assignee: Amazon Technologies, Inc., Seattle, WA (US)

( * ) Notice: Subject to any disclaimer, the term of this patent is extended or adjusted under 35 U.S.C. 154(b) by 223 days.

(21) Appl. No.: 15/830,964

(22) Filed: Dec. 4, 2017

(51) Int. Cl.
*G06F 16/00* (2019.01)
*G06F 16/22* (2019.01)

(52) U.S. Cl.
CPC ...... *G06F 16/2219* (2019.01); *G06F 16/2282* (2019.01)

(58) Field of Classification Search
CPC .................................................. G06F 16/278
See application file for complete search history.

(56) References Cited

U.S. PATENT DOCUMENTS

| | | | | |
|---|---|---|---|---|
| 2007/0300250 A1* | 12/2007 | Smith | .................... | H04H 20/31 725/20 |
| 2011/0138144 A1* | 6/2011 | Tamura | ................. | G06F 3/0608 711/166 |
| 2014/0046909 A1* | 2/2014 | Patiejunas | ......... | G06F 16/24554 707/687 |
| 2014/0229452 A1* | 8/2014 | Serita | .................. | G06F 16/1748 707/692 |
| 2015/0186043 A1* | 7/2015 | Kesselman | ........... | G06F 3/0614 711/162 |
| 2016/0360279 A1* | 12/2016 | Batmanglidj | ...... | H04N 21/4828 |

* cited by examiner

*Primary Examiner* — Hung Q Pham
(74) *Attorney, Agent, or Firm* — Lowenstein Sandler LLP

(57) ABSTRACT

A method and system for partitioning large objects for use by an application in a computing environment is described. The large object to be uploaded is analyzed in view of a desired partition size. The desired partition size may be selected by a customer system to generate a partition plan. The partition plan includes instructions identifying multiple partitions to be individually uploaded by respective execution modules. The system splits or partitions the original object into smaller, easier to manage partitions to be processed by the application running in the computing environment. The instructions defining the partitions are distributed to individual computing services for generating and uploading the partitions to the storage accessible by the application.

20 Claims, 6 Drawing Sheets

LARGE OBJECT PARTITIONING SYSTEM

BACKGROUND

In cloud computing environments, a customer system may wish to process text data of a very large object stored in a storage of a computing system. However, typical data processing applications cannot process very large objects (e.g. 100s of GB or TBs in size) as such objects would either crash the application or cause the application to perform poorly.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

Figure 1:
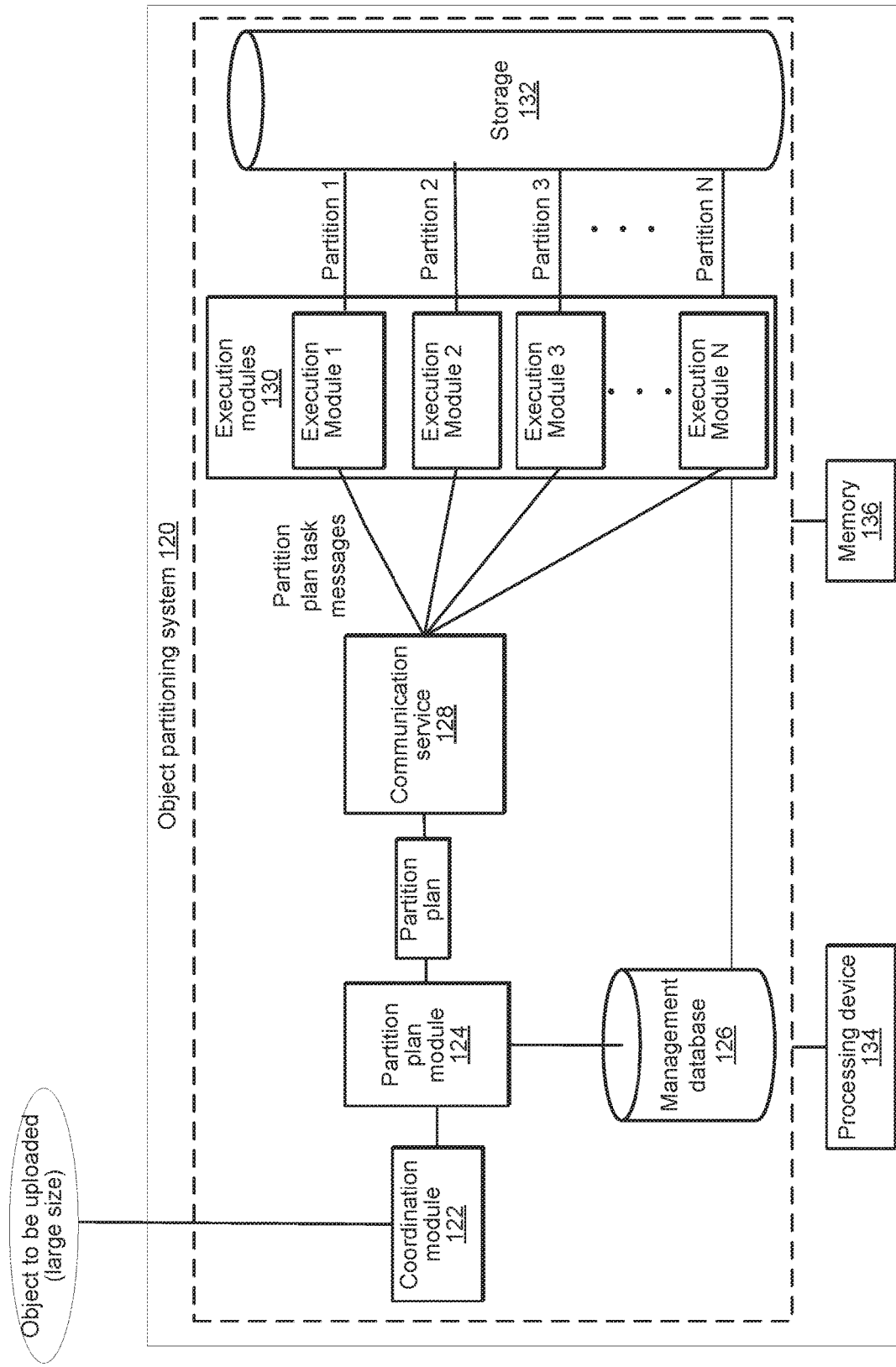
FIG. 1 illustrates an example environment including an object partitioning system, according to one embodiment.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to systems and methods for enabling the partitioning of large objects (e.g., text files that are approximately 100 GB to 5 TB in size). In one embodiment, an object partitioning system is provided to identify the large object associated with a customer system to be processed by an application (also referred to as a "target application") running in a computing environment (e.g., a cloud computing environment). In one embodiment, the object partitioning system splits or partitions the original object into smaller, easier to manage partitions that may be processed by the target application. In one embodiment, the partitions are distributed to individual computing services (e.g., execution modules such as Amazon® Lambda functions) for partitioning and uploading to storage (e.g., the Amazon® Simple Storage Service (S3)) accessible by the target application. In one embodiment, the storage is configured to support random access (offset value based) for the objects to enable the identification of partitions of the object. In one embodiment, the storage supports the distributed multi-part uploads generated by the multiple different execution modules in a stateless and serverless environment.

In one embodiment, the computing services may be an event-driven, serverless computing platform (e.g., a platform wherein a customer system does not need to provision, scale, or manage servers) that runs code in response to events (e.g., HTTP/S requests) and manages the compute resources required by the code. In a serverless environment, according to embodiments, the execution computing services are provided without requiring provisioning, maintaining, and administering servers for backend components such as compute, databases, storage, stream processing, message queueing, etc.

In one embodiment, code associated with the target application may be uploaded by a customer system to the computing environment (e.g., a serverless computing environment). In one embodiment, the one or more execution modules (e.g., computing services of the computing environment) may be used to execute the code of the application, without the customer system having to provision, administer, manage, or scale servers to execute a high-availability application.

In one embodiment, a first computing service (also referred to as a "partition plan module or starter computing service) identifies the original large object (e.g., a comma-separated values (CSV) file, a JavaScript Object Notation (JSON) file, an Extensible Markup Language (XML) file, etc.) and one or more partitioning parameters (e.g., a desired maximum partition size) from the source system. In one embodiment, the first computing service analyzes the original object and generates a partitioning plan for the object. The partition plan identifies multiple partitions of the object for distribution to and uploading by other "worker" computing services (e.g., Amazon® Lambda functions). A service may be a component, script, application, or other executable function or set of functions capable of performing one or more operations. The partition parameters and related instructions or tasks are communicated to the multiple worker computing services via a messaging system (e.g., Amazon Simple Notification System (SNS)). The messages distributed by the messaging system include a payload identifying the partitioning instructions that are used to invoke the worker computing services to perform the partitioning and uploading of the partitions for consumption by the target application. In one embodiment, each individual partition is generated in a manner such that the underlying data records (e.g., portions of the data of the original large object) are maintained in full, without truncation that would create undesirable breaks or cuts in the data.

In one embodiment, the object management system includes a coordination module (e.g., Amazon® Step Functions) to orchestrate the various partitioning and uploading activities of the worker computing services (also referred to as "execution modules"). In one embodiment, the coordination module is part of a serverless platform (e.g., the Amazon® Web Services Serverless Platform). In one embodiment, distribution and tracking of the messages associated with the partition plan and the uploading activities (also referred to as "partitioning tasks") of the execution modules are orchestrated by the coordination module. In one embodiment, the storage of the cloud computing environment receives the multiple uploaded partitions from the multiple execution modules and stores the multiple partitions for consumption by one or more downstream target applications. Advantageously, the multiple partitions are generated and stored in sizes that are capable of processing by the target application, without causing the target application to crash. For example, an original object that is 5 TB that would cause a target application to crash or would require computational expensive clustering with multiple compute nodes when the target application attempts to process the large object. Advantageously, according to embodiments, the large object is split by individual execution modules to generate partitions that are sized for processing by one or more target applications running in a cloud computing environment.

FIG. 1 is a block diagram illustrating an example cloud computing environment including an object partitioning system 120 operatively coupled to an object source system 110. In one embodiment, a source of the object (e.g., a storage accessible by a customer system) communicates with the object partitioning system 120 via a suitable network, including, for example, the Internet, intranets, extranets, wide area networks (WANs), local area networks (LANs), wired networks, wireless networks, or other suitable networks, etc., or any combination of two or more such networks. In one embodiment, the object partitioning system 120 may further include a processing device 134 and a memory 136 configured to execute and store instructions associated with the functionality of the various components, services, modules, execution engines, applications, and programs of the object partitioning system 120, as described in greater detail below in connection with FIGS. 2-5.

In one embodiment, the object source system 110 (e.g., a customer system) provides an object to be uploaded to a storage 132 associated with the object partitioning system 120. In one embodiment, the object source system 110 may be any suitable computing device (e.g., a desktop computer, a laptop computer, a mobile device, a server, a virtual computing system, etc.) that provides a large object for uploading to the storage 132. In one embodiment, the large object may be a text-based file that has a size that exceeds an object size threshold value. For example, the object partitioning system 120 may maintain an object size threshold value (e.g., a size in an approximate range of 10 GB to 5 TB) that is used to determine if the size of an object exceeds the size threshold and is to be considered a large object to be managed according to the processes described herein. In one embodiment, the object may be identified as a large object if it has a size that exceeds the partition size threshold value identified by the customer system.

In one embodiment, if an object to be uploaded has a size that exceeds the object size threshold, the object may be deemed a large object and provided to the coordination module 122 of the object partitioning system 120. In one embodiment, a desired partition size (also referred to as a "partition size threshold value") may be indicated by a customer system associated with the large object. For example, an original object of 100 GB may be provided with a partition size threshold value of 5 GB (e.g., each partition should be no more than 5 GB in size). In this example, in one embodiment, twenty partitions (5 GB each) are generated for processing by respective execution modules 130 configured to manage 5 GB of memory for the associated data handling.

In another embodiment, in this example, the execution modules 130 may have a size limit (e.g., 800 MB, 1.5 GB, etc.) that is less than the partition size threshold value (e.g., 5 GB). In this example, multiple execution modules 130 collaborate to build a multi-part partition of 5 GB. In one embodiment, the coordination module 122 is configured to orchestrate the activities performed by the various execution modules 130 in building the multi-part partition, as described in greater detail below. In one embodiment, the coordination module 122 may be comprised of an Amazon® Step Function or other execution platform to orchestrate the various partitioning and uploading activities of the worker computing services (also referred to as "execution modules"). In one embodiment, the coordination module is part of a serverless platform (e.g., the Amazon® Web Services Serverless Platform). In one embodiment, distribution and tracking of the messages associated with the partition plan and the uploading activities (also referred to as "partitioning tasks") of the execution modules are orchestrated by the coordination module. In one embodiment, the coordination module 122 manages distribution of the partition tasks and orchestrates the performance and tracking of the partition tasks.

In one embodiment, the object partitioning system 120 includes a partition plan module 124 (also referred to as a "starter execution module") and multiple other execution modules 130. In one embodiment, the partition plan module 124 uses the partition size threshold value (e.g., as selected or indicated by a customer system) to determine the size of each individual partition of the large object. For example, a large object of 100 GB may be received with a partition size threshold value of 5 GB. In this example, the partition plan may include instructions for generating 20 partitions of the original 100 GB object. In one embodiment, the partition plan module 124 is one of the multiple execution modules 130 that is identified or selected to perform the initial processing of the large object. In one embodiment, the coordination module 122 selects a module from the execution modules 130 to serve as the partition plan module 124 for the processing of a particular object. In one embodiment, the object partitioning system 120 receives the large object to be partitioned from a storage location of the computing environment (e.g., a cloud computing environment). Example uploading parameters include, but are not limited to, a partition size threshold value (e.g., a maximum size that a partition should be), object identifying information (e.g., a name of the object, a source bucket, etc.)

In one embodiment the partition plan module 124 is configured to receive the large object and related one or more uploading parameters (e.g., the maximum partition size) and generate a partition plan for execution by the multiple execution modules 130. In one embodiment, the partition plan module 124 validates the object. In one embodiment, the partition plan includes information identifying the multiple partitions for the large object. In one embodiment, the partition plan identifies the multiple partitions including the associated partition information (e.g., start point offset value, end point offset value, partition identifier, the desired partition size threshold value, etc.) that may be used to generate the multiple partitioning tasks to be distributed to the execution modules 130 via a communication service 128 as respective messages. In one embodiment, the partitions established by the partition plan module 124 are based at least in part on the partition size threshold value identified by the customer system. In one embodiment, the partition plan module 124 may perform additional validations associated with the partitioning of the large object, including, for example, confirming that the indicated partition size threshold value is above a minimum partition size to avoid overworking the execution modules in generated a large number of small partitions.

In another example, the execution modules 130 may each have a maximum partition size that the execution module 130 is capable of processing (e.g., the execution module may be an Amazon® Lambda function having a maximum partition size of less than a size limit, such as 800 MB or 1.5 GB). In this example, it may be determined that the partition threshold size value (e.g., 8 GB) exceeds the maximum partition size of the individual execution modules 130, thereby resulting in the performance of multi-part partitioning. In this example, the multi-part partitioning includes the use of multiple execution modules (e.g., 10 execution modules) to each generate a part of the multi-part partition (e.g., each execution module 130 generates an 800 MB part of the partition) and the partition is built based on the multiple parts.

In one embodiment, the object partitioning system 120 includes a management database 126 or other data store configured to store information associated with coordination of the partition tasks. The management database 126 may be any suitable database service (e.g., a cloud database service), such as, for example, the Amazon® DynamoDB service. In one embodiment, as described above, if the partition size exceeds a maximum size associated with an execution module, multi-part partitioning may be performed. In one embodiment, multi-part partition involves splitting a partition (e.g., partition 1) into further sub-partitions (e.g., partition 1A, partition 1B, partition 1C) to enable the execution module 130 to perform the partitioning tasks in view of the execution module's partition size limit. In one embodiment, the coordination module 122 and the management database 126 coordinate the multi-part upload of the object. In one embodiment, the multi-part upload of the same object is distributed over multiple stateless execution modules 130 with tracking information persisted in the management database 126 for coordination purposes. In one embodiment, the execution modules 130 are invoked by receiving the partition plan task messages which include the partitioning instructions (as defined by the partition plan).

In one embodiment, the communication service 128 (e.g., the Amazon Simple Notification Service (SNS)) may be any suitable communication interface or layer that is configured to process the partition plan and generate messages associated with each of the identified partitioning tasks. In one embodiment, the communication service 128 publishes, posts, transmits, or otherwise distributes a message (e.g., an Amazon SNS published topic) for each of the identified partitioning tasks (also referred to as "partition plan task messages").

In one embodiment, the multi-part upload to the storage 132 includes the multiple partitions (e.g., partition 1, partition 2, partition 3, and partition N in FIG. 1) generated by the execution modules 130 (e.g., execution module 1, execution module 2, execution module 3, and execution module N). In one embodiment, in the event that multi-part uploading is performed by the execution modules 130, the storage 132 is configured to assemble the smaller parts to build a single partition of the object. In one embodiment, the storage 132 is configured to perform random access (offset-based access) for the objects. The storage 132 may also be configured to support distributed multi-part upload that enables the creation of any size partitions (e.g., partitions of any size up to approximately 5 TB). In one embodiment, the multi-part upload of the same object is distributed over multiple stateless execution modules 130 with tracking information persisted in the management database 126 for coordination purposes.

Figure 2:
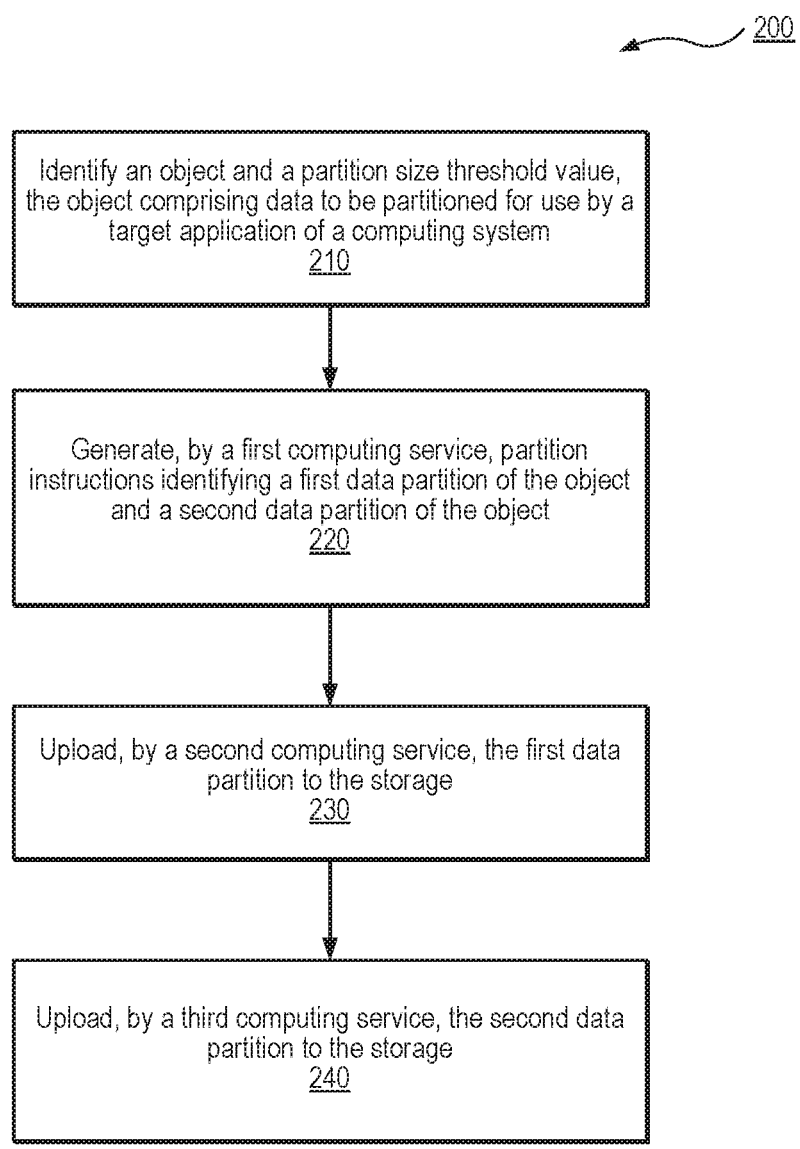
FIG. 2 is a flow diagram illustrating an example method of managing the upload of a large object to storage of a computing environment, according to one embodiment.

FIG. 2 illustrates a flowchart that provides an example of a process 200 executed by a system (e.g., object partitioning system 120 of FIG. 1) operatively coupled to a source system (e.g., object source system 110 of FIG. 1) to split or partition a large object (e.g., a text-based object having a large file size) into multiple partitions for upload to storage of a computing environment, according to various embodiments. It is understood that the flowchart of FIG. 2 provides an example of the many different types of functional arrangements that may be employed to implement the operation of the object partitioning system, as described herein. Process 200 may be performed by a processing logic that may comprise hardware (e.g., circuitry, dedicated logic, programmable logic, microcode, etc.), software (e.g., instructions stored in a memory (e.g., memory 136) run on a processing device, such as processing device 134 of FIG. 1), or a combination thereof.

In block 210, the object partitioning system identifies an object (e.g., a text-based file) including data to be uploaded to storage of a computing system and an indication of a partition size threshold value (e.g., as indicated by a customer system). In one embodiment, the object has a large size (e.g., a size greater than an object size threshold value) and is identified for partitioning by the object partitioning system. In one embodiment, the indication of the partition size threshold value indicates a maximum size for each partition, as identified by the source system. In one embodiment, additional other information associated with the object may also be provided in connection with the large object, such as, an object name, an object source identifier, etc.

In block 220, the object partitioning system employs a first computing service (e.g., the partition plan module 124 of FIG. 1) to serve as a "starter" execution module configured to generate a partition plan including partition instructions associated with the object. In one embodiment, the partition instructions identify multiple partitions for the object, including, for example, a first data partition and a second data partition. Although the example described in connection with FIG. 2 is based on an object split into two partitions, any number of partitions may be employed. In one embodiment, the partitioning information associated with the first data partition and the second data partition (e.g., the offset values associated with the start point and end point of the each partition) are identified based at least in part on the partition size threshold value. In one embodiment, both the first partition and the second partition are sized to be less than the partition size threshold value.

In block 230, a second computing service (e.g., one of the multiple execution modules 130 of FIG. 1) uploads the first data partition to the storage. In one embodiment, the second computing service (e.g., an Amazon® Lambda function) is invoked by a message generated by a communication service based on the partitioning information of the partition plan. In one embodiment, the second computing service uploads the portion or partition of the large object that corresponds to a start point (e.g., a first offset value of the object) and an end point (e.g., a second offset value of the object) of the first partition as defined by the partition plan.

In block 240, a third computing service (e.g., one of the multiple execution modules 130 of FIG. 1) uploads the second data partition to the storage. In one embodiment, the third computing service (e.g., an Amazon® Lambda function) has the second data partition task distributed to it via the communication service (e.g., the Amazon SNS service) in accordance with the partition plan.

Figure 3:
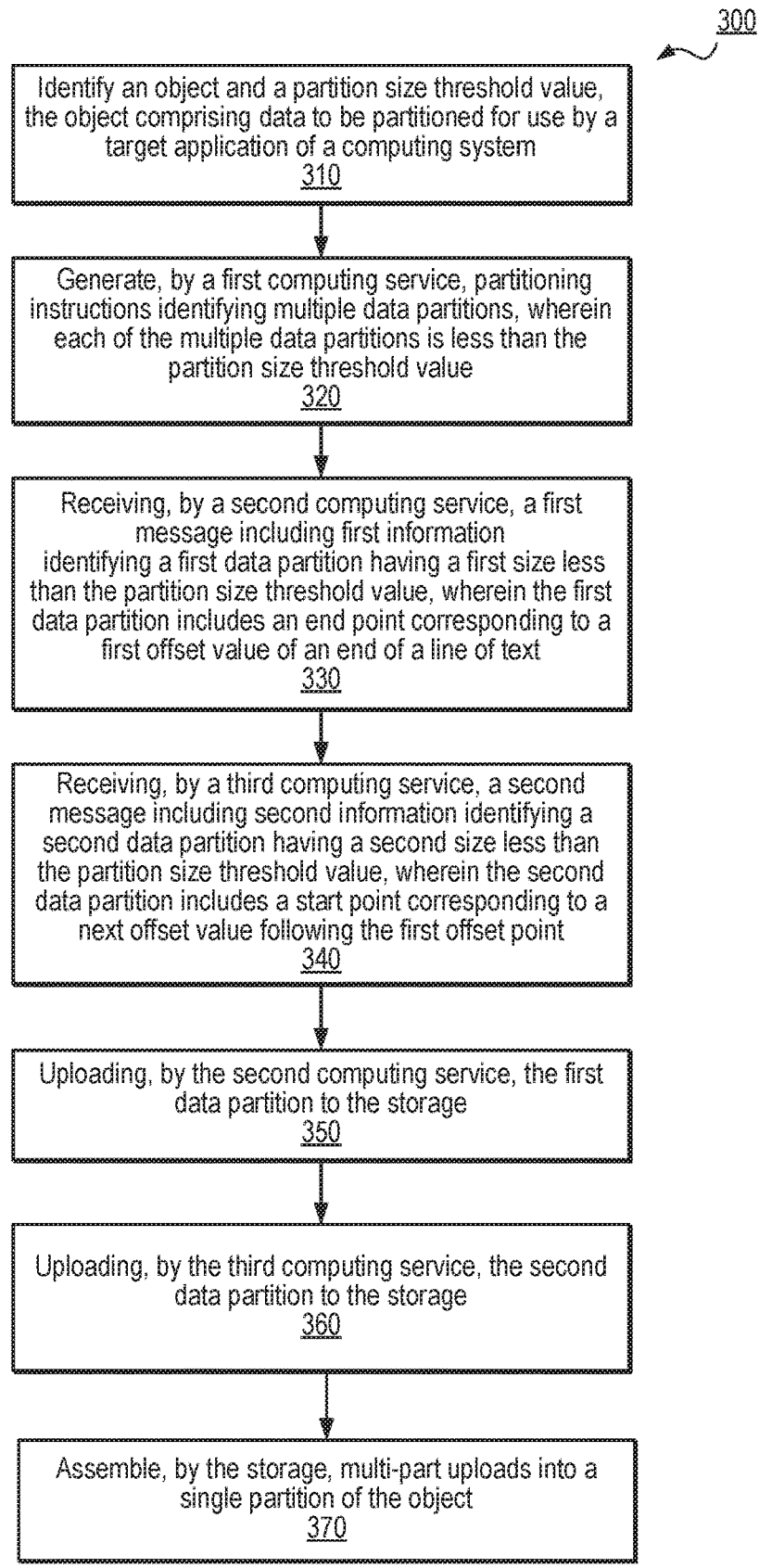
FIG. 3 is a flow diagram illustrating an example method of managing the partitioning of a large object to storage of a cloud computing environment, according to one embodiment.

FIG. 3 illustrates a flowchart that provides an example of a process 300 executed by a system (e.g., the object partitioning system 120 of FIG. 1) to enable the uploading of a large object (e.g., a text-based file exceeding 1 GB) by a source system (e.g., a customer system) to a storage location of a computing environment. The process 300 is described using an example wherein two data partitions are generated for the original object received from a source system, however, the large object may be split into any number of partitions according to the described methodology.

In block 310, a large object (e.g., an object having a size that exceeds an object size threshold) to be uploaded to storage of a computing environment is identified. In one embodiment, the object is a text-based file (e.g., a comma-separated values (CSV) file, a JavaScript Object Notation (JSON) file, an Extensible Markup Language (XML) file, etc.) that includes data including various characters and symbols corresponding to respective offset values (e.g., locations within the file). In one embodiment, the object includes identifiable characters or symbols that denote a boundary (e.g., a start point or an end point) within the data. For example, the object may include multiple boundary indicators (e.g. a Carriage Return Line Feeds (CRLFs) or other line break types) that denote an end point of a line of text (e.g., letters, numbers, symbols, etc.) and, in certain instances, a start point of a next line of text. In one embodiment, each of the boundary indicators corresponds to an offset value (e.g., location) in the object.

In block 320, partitioning instructions corresponding to the object are generated. The partitioning instructions identify multiple data partitions that may be used to split the object up for uploading by multiple execution modules. In one embodiment, each of the multiple data partitions has a size that is less than the partition size threshold value (e.g., as identified by the source system that initiated the upload of the object). In one embodiment, one of multiple execution modules (e.g., a first computing service) is identified as a starter execution module designated to generate the partition plan. In one embodiment, the starter execution module (or partition plan module) is an Amazon Lambda Function configured to validate the object and generate the partition plan identifying the multiple partitions (e.g., a plan identifying how the large object is to be split up with the individual partitions being uploaded to storage by respective execution modules).

In block 330, a message is generated for each of the partitioning tasks identified by the partitioning instructions. For example, in block 330, a first message is received by an execution module (e.g., a second computing service). The first message includes first information identifying a first data partition in accordance with the partition plan. The first data partition is identified by a first start point and a first end point and is configured to have a size that is less than the partition size threshold value. In one embodiment, the end point of the first data partition corresponds to a first offset point of an end of a line of text within the object.

In one embodiment, multiple soft-end locations within the object may be identified. The soft-end location may correspond to an offset location that is determined by applying a maximum record size value (r). In one embodiment, the soft-end location corresponds to an offset value determined by reducing the partition size threshold value (p) by the maximum record size value (r), as described in detail with respect to the example illustrated in FIG. 5. For example, if the partition size threshold value is 1000 and the maximum record size value (r) is 100, a first soft-end location for a first data partition is 900, as determined by the following example expression: soft-end location offset value=p−r. For example, the first data partition may have a start point corresponding to an offset value of 0 (e.g., a beginning of the object) and a soft-end point corresponding to an offset value of 900 (e.g., p−r, wherein p=1000 and r=100). In one embodiment, a first boundary indicator (e.g., a CRLF denoted an end of a line of text) after the soft-end point is identified and designated as the end point of the first data partition. The process of identified the soft-end location and a next CRLF following the soft-end location is performed to determine the end point of each of the data partitions. In one example, a CRLF located at an offset point of 927 (following the soft-end location offset value (900) but before the partition size threshold offset value (1000) is identified as an end point of the first data partition.

In block 340, an execution module (e.g., a third computing service) receives a second message including second information identifying a second data partition. In one embodiment, the second data partition has a size that is less than the partition size threshold value. In one embodiment, the second data partition has a start point corresponding to a next offset value following the first offset value (i.e., the end point of the first data partition). In this example, the partition plan indicates a start point for the second partition at the 900 offset value since the actual boundary of the first partition (e.g., offset value 927) is not yet determined at the time of the generation of the partition plan. Using the partition plan and the indication of a start point of 900 byte offset, the execution module generating the second partition may start from the 900 offset location and identify a first boundary indicator (e.g., the same boundary as the end point of the first partition at the 927 byte offset location). In one embodiment, based on this determination, the start point of the second data partition is identified as having an offset value of 928 (i.e., a next offset value following the offset value corresponding to the end point of the previous data partition). In one embodiment, the end point of the second data partition may be calculated as described above with respect to the end point of the first data partition (e.g., by identifying a boundary indicator within a range between an offset value corresponding to a soft-end location and an offset value corresponding to the maximum partition size threshold value), as described in detail with respect to the example illustrated in FIG. 5.

In block 350, the execution module processing the first data partition (e.g., the second computing service) uploads the first data partition to storage of the computing environment (e.g., a cloud computing environment). In block 360, the execution module processing the second data partition (e.g., the third computing service) uploads the first data partition to storage of the cloud computing environment. The uploading of the first and second data partitions may be performed in series or in parallel, and may be performed in any order.

In one embodiment, optionally, in block 370, if either or both of the first partition and the second partition include multi-part uploads, the storage (e.g., Amazon® S3) assembles the multiple parts of the multi-part upload into a single partition (e.g., the first partition or the second partition). It is noted that although the example illustrated in FIG. 1 includes two partitions, the object may be divided into any number of partitions.

Figure 4:
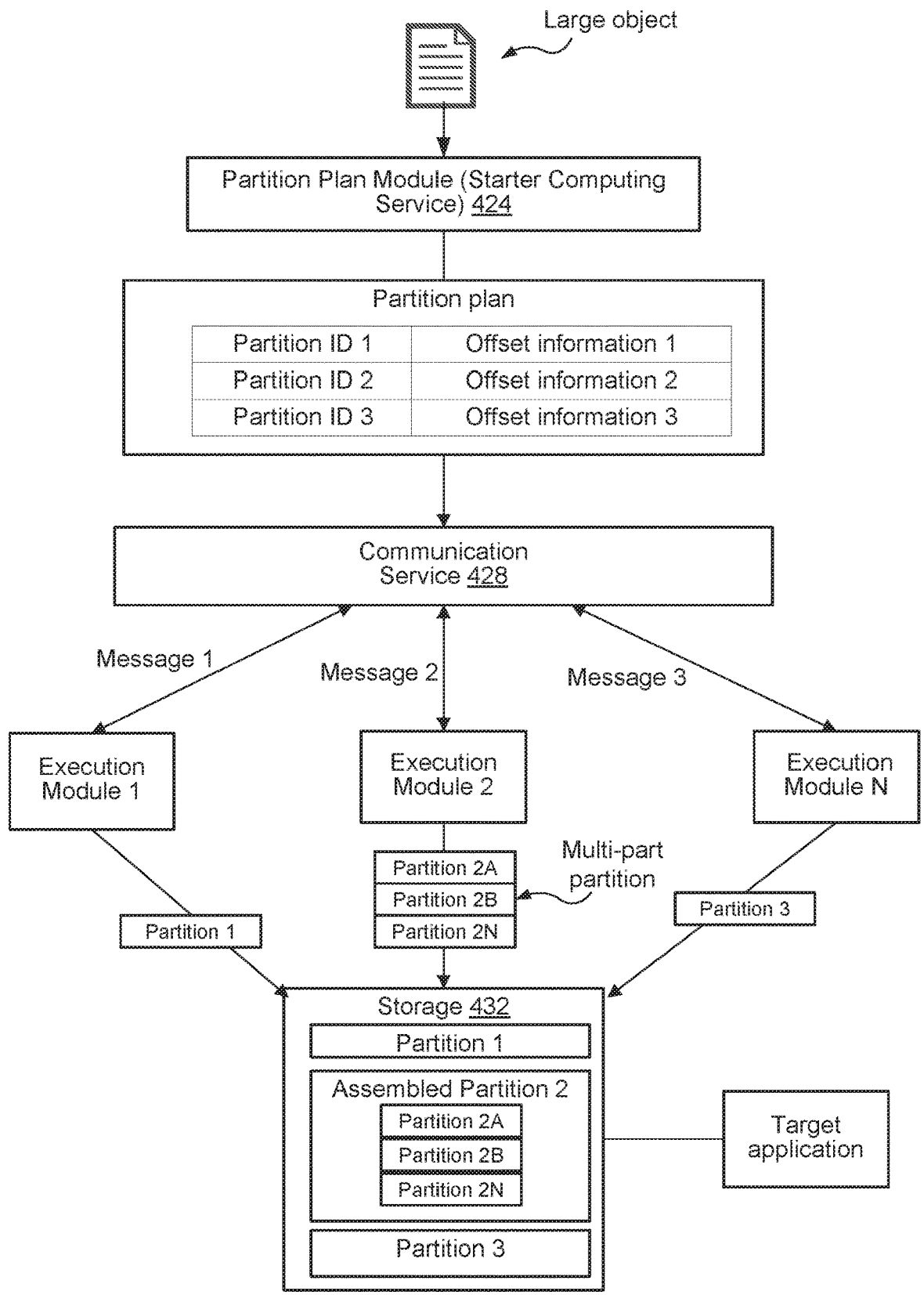
FIG. 4 illustrates an example flow diagram including the partitioning of a large object to storage of a computing environment, according to one embodiment.

FIG. 4 illustrates an example implementation of the object upload process according to the methods and systems described herein, according to one or more embodiments. FIG. 4 illustrates an example large object (e.g., a file having a size that is greater than 2 GB) being uploaded by a source system (e.g., a customer system). In one embodiment, the large object is received by a partition plan module (e.g., a starter execution module) 424. In one embodiment, the partition plan module 424 may be selected from multiple execution modules by a management module configured to orchestrate the activities of the multiple execution modules (e.g., the starter execution module 424, execution module 1, execution module 2, and execution module N).

In one embodiment, the partition plan module 424 generates a partition plan including information identifying multiple partitions of the large object. In one example, the partition plan assigns a partition identifier (e.g., any sequence of characters to uniquely identify each partition) to each of the partitions (e.g., Partition ID 1, Partition ID 2, and Partition ID 3). In one embodiment, the partition identifiers are provided to the management module (not shown) and used to identify the respective partitions and track the partition tasks throughout the distributed uploading process. In one embodiment, the partition plan includes offset information corresponding to each of the partition. The offset information (e.g., Offset Information 1, Offset Information 2, and Offset Information 3) identifies a first offset value corresponding to a start point of a particular partition and a second offset value corresponding to an end point of the particular partition.

In one embodiment, the partition tasks associated with the partition plan are distributed to the execution modules via a communication service 428. In one embodiment, the communication service 428 provides multiple messages (e.g., Message 1, Message 2, and Message 3) each identifying and defining a respective partition task (e.g., instructions including a partition ID and corresponding offset information). In one embodiment, the execution modules are each invoked by a corresponding message to perform the partition task identified by the message. In one embodiment, the message may be provided by the communication service 428 (e.g., via a push communication) or retrieved by the execution module from the communication service 428 (e.g., via a pull communication).

In one embodiment, a management database (e.g., management database 126 of FIG. 1) may contain information relating to the partition plan and the execution of the partition tasks. In one embodiment, the management database may identify each partition task by the corresponding partition ID and receive updates via the execution modules relating to the status of the partition tasks.

In one embodiment, the execution modules each upload a respective partition to storage 432 in accordance with the corresponding partition task. In one embodiment, if the identified partition (e.g., Partition 1 and Partition 3) has a size that less than a maximum partition size associated with the execution module, the execution module is configured to upload the partition in its entirety. For example, the execution modules may have a maximum partition size of 800 Mb. If the partition size threshold value (e.g., a partition size requested by the customer system) for Partition 1 is 500 Mb, then the execution module 1 is configured to upload the entire Partition 1 to storage, since the request partition size is less than the maximum partition size for the execution module.

In one embodiment, if the partition size threshold value is greater than the maximum partition size that can be handled by an execution module, the execution module employs multi-part upload functionality. In an example, the original size of the large object may be 100 Gb and the partition size threshold value identified by the customer system is 5 Gb. In this example, the execution module (e.g., execution module 2 in FIG. 4) has a maximum partition size limit of 800 Mb. To process a partition of 5 Gb (e.g., Partition 2 in FIG. 4), execution module 2 splits Partition 2 into multi-part uploads. For example, 25 multi-part uploads that are 200 Mb in length may be processed by execution module 2 (denoted as Partition 2A, Partition 2B, and Partition 2N in FIG. 4). In one embodiment, each of the multi-part partitions is assigned a unique multi-part partition identifier (also referred to as a multi-part ID) for use in assembling the single partition (e.g., Partition 2) based on its corresponding multi-part partitions.

In one embodiment, storage 432 assembles the uploaded multi-part uploads (e.g., Partition 2A, Partition 2B, and Partition 2N) into a single partition (e.g., Partition 2), as shown in FIG. 4. In one embodiment, the multi-part uploads are assembled by the storage 432 using the corresponding partition IDs and multi-part IDs. In one embodiment, when all of the partitions of the object have been provided to the storage 432 (e.g., committed to the storage 432), a command may be executed to cause the completion of the assembly (e.g., if multi-part uploads are in the storage 432) and upload process. In one embodiment, the command may be executed by one of the execution modules (e.g., the partition plan module 424, execution module 1, execution module 2, or execution module 3 in the example shown in FIG. 4). In one embodiment, as shown in FIG. 4, the storage 432 is accessible by a target application configured to process the partitions of the object.

Figure 5:
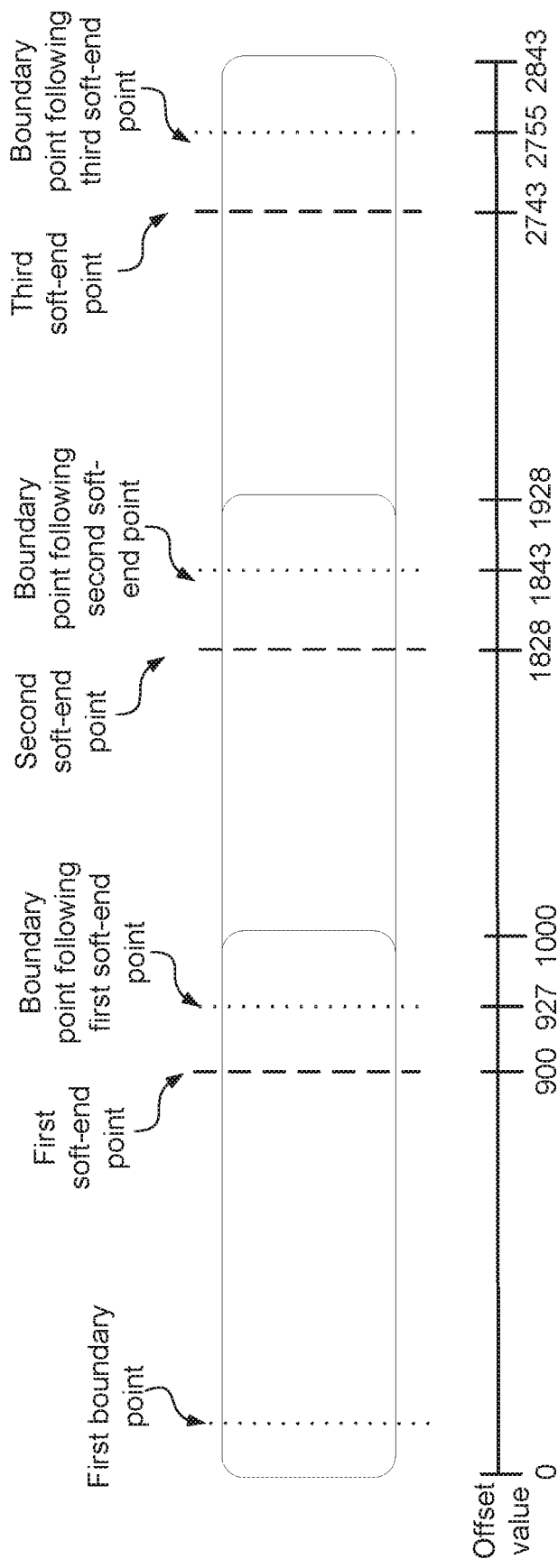
FIG. 5 illustrates an example partitioning of an object to be used by an application executed in a computing environment, according to one embodiment.

FIG. 5 illustrates an example partitioning of a large object, according to embodiments of the present disclosure. The example shown in FIG. 5 illustrates a large object split into three partitions, according to embodiments of the processes described herein. As shown in FIG. 5, an offset value scale is shown to identify various offset values of the data of the object. FIG. 5 also includes a tabular representation of the partition plan including an execution module associated with a partition task identified by a partition identifier and a corresponding offset value range.

As shown in FIG. 5, a first partition is identified as having a first start point at an offset value of 0. To determine an end point of the first partition (Partition ID 1), a first soft-end point is determined. As described above, the first soft-end point is determined by reducing the partition size threshold value (p=1000) by a maximum record size (r=100). In this example, the first soft-end point corresponds to an offset value of 900. In one embodiment, a boundary point or indicator following the first soft-end point is identified. In one embodiment, the boundary point indicates an end of a line of text within the data of the first partition. For example, the boundary point may be a CRLF in a CSV or JSON file. As shown, the boundary indicator following the soft-end point has an offset value of 927. Accordingly, the first partition is set to include the data between the offset values of 0 and 927.

In one embodiment, a start point of a next partition is the offset value following the end point of the previous partition. In this example, the start point of the second partition (Partition ID 2) is identified as having an offset value of 928. This is determined by the execution module by first identifying a soft-start point for partition 2 (e.g., offset value 900) and identifying a next boundary point (e.g., the boundary at offset location 927). The execution module then determines that the start point for the partition it is processing (partition 2) is the next offset value, (e.g., offset location 928). As described above, a soft-end point corresponding to the second partition is identified. With a start point of 928 (as determined above), a maximum end point based on the partition size threshold value (p=1000) is 1928. In this example, the soft-end point for the second partition has an offset value of 1828 (1928–the max record size (r=100)). A boundary indicator (e.g., CRLF) following the soft-end point of the second partition is identified. In this example, a CFLF is identified at an offset location of 1843. Accordingly, the end point of the second partition is set to 1843, producing an offset value range for the second partition of 928-1843, as shown in the table in FIG. 5. The process described herein may be repeated to identify offset values (1844-2755) defining a third partition (e.g., Partition ID 3). It is noted that the partitioning process illustrated in FIG. 5 may be performed for any number of partitions until the entire original object has been split up and uploaded to storage.

Figure 6:
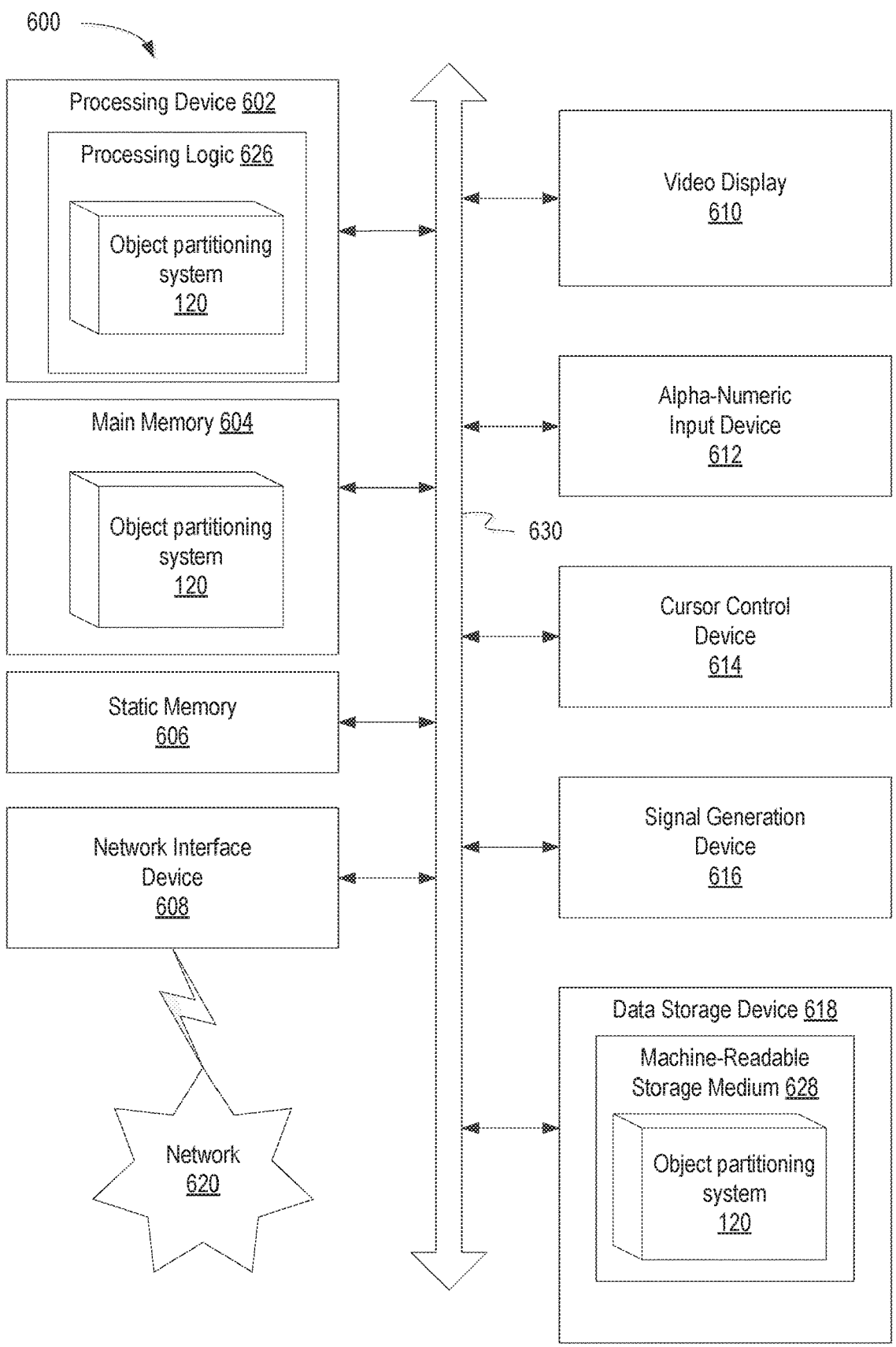
FIG. 6 is a schematic block diagram that provides an example illustration of a computing environment executing instructions relating to managing the partitioning of a large object, according to one embodiment.

FIG. 6 illustrates a diagrammatic representation of a machine in the example form of a computer system 500 including a set of instructions executable by an object partitioning system (e.g., object partitioning system 120 of FIG. 1) to cause the system to perform any one or more of the methodologies discussed herein. In one embodiment, the object partitioning system operates in a cloud computing environment including storage for storing a large object uploaded by a source system. In one embodiment, the object partitioning system may include instructions to enable execution of the processes and corresponding components shown and described in connection with FIGS. 1-5.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. In various implementations of the present disclosure, the processing device 602 is configured to execute instructions for the object partitioning system for performing the operations and processes described herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 514 (e.g., a mouse), and a signal generation device 616 (e.g., a speaker).

The data storage device 618 may include a computer-readable medium 628 on which is stored one or more sets of instructions of the object partitioning system embodying any one or more of the methodologies or functions described herein. The instructions may also reside, completely or at least partially, within the main memory 604 and/or within processing logic 626 of the processing device 602 during execution thereof by the computer system 600, the main memory 604 and the processing device 602 also constituting computer-readable media.

The instructions may further be transmitted or received over a network 620 via the network interface device 608. While the computer-readable storage medium 6528 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "generating", "uploading", "assembling", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying an object comprising data to be uploaded to a storage for use by an application of a computing system;
   determining a partition size threshold value identified by a customer system associated with the object;
   determining a first offset point corresponding to an end of a line of text within the object;
   generating, by a first computing service, partitioning instructions identifying:
      a first data partition having a first size less than the partition size threshold value, wherein the first data partition comprises an end point corresponding to the first offset point of the object;
      a second data partition having a second size less than the partition size threshold value, wherein the second data partition comprises a start point corresponding to a next offset value following the first offset value;
   receiving, by a second computing service, a first message comprising first information identifying the first data partition;
   receiving, by a third computing service, a second message comprising second information identifying the second data partition;
   uploading, by the second computing service, the first data partition to the storage; and
   uploading, by the third computing service, the second data partition to the storage.

2. The method of claim 1, wherein the first data partition comprising a plurality of uploads each generated by a computing service of a plurality of computing services.

3. The method of claim 2, further comprising:
   associating a first upload of the plurality of uploads of the first data partition with a first multi-part identifier;
   associating a second upload of the plurality of uploads of the first data partition with a second multi-part identifier;
   using the first multi-part identifier and the second multi-part identifier to assemble the first upload and the second upload to generate the first data partition in the storage.

4. The method of claim 1, wherein the first data partition comprises a plurality of parts individually uploaded by the second computing service.

5. The method of claim 4, wherein the end point corresponding to the first offset point of the end of the line of text corresponds to a carriage return line feed.

6. A system comprising:
   a processing device; and
   a memory to store computer-executable instructions that, if executed, cause the processing device to:
      identify an object and a partition size threshold value, the object comprising data to be uploaded to a storage for use by an application of a computing system;
      determine a first offset point corresponding to an end of a line of text within the object;
      generate, by a first computing service, partitioning instructions identifying:
         a first data partition having a first size that is less than the partition size threshold value, wherein the first data partition comprises an end point corresponding to the first offset point of the object;
         a second data partition having a second size that is less than the partition size threshold value;
      upload, by a second computing service, the first data partition to the storage; and
      upload, by a third computing service, the second data partition to the storage.

7. The system of claim 6, wherein a size of the object exceeds an object size threshold value.

8. The system of claim 6, the processing device to generate a first message comprising partition instructions associated with the first data partition.

9. The system of claim 8, the second computing service to receive the first message and execute the upload of the first data partition in accordance with the partition instructions.

10. The system of claim 6, wherein the first data partition comprises an end point corresponding to a first offset point of an end of a line of text.

11. The system of claim 10, wherein the second data partition comprises a start point corresponding to a next offset value following the first offset value.

12. The system of claim 6, wherein the partition size threshold value exceeds a maximum partition size threshold corresponding to the second computing service.

13. The system of claim 12, the second computing service to upload the first data partition in a plurality of parts.

14. The system of claim 13, wherein each of the plurality of parts of the first data partition is associated with a unique multi-part identifier.

15. The system of claim 14, wherein the plurality of parts of the first data partition are assembled based on the unique multi-part identifier associated with each of the plurality of parts.

16. A non-transitory computer-readable storage device storing computer-executable instructions that, if executed by a processing device, cause the processing device to:
receive an object and a partition size threshold value, the object comprising data to be uploaded to a storage for use by an application of a computing system, wherein the partition size threshold value is provided by a customer system associated with the object;
determine a first offset point corresponding to an end of a line of text within the object;
generate, by a first computing service, partitioning instructions identifying:
a first data partition having a first size that is less than the partition size threshold value, wherein the first data partition comprises an end point corresponding to the first offset point of the object;
a second data partition having a second size that is less than the partition size threshold value;
upload, by a second computing service, the first data partition to the storage; and
upload, by a third computing service, the second data partition to the storage.

17. The non-transitory computer-readable storage device of claim 16, wherein the partition size threshold value exceeds a maximum partition size threshold corresponding to the second computing service.

18. The non-transitory computer-readable storage device of claim 17, the second computing service to upload the first data partition in a plurality of parts.

19. The non-transitory computer-readable storage device of claim 18, wherein each of the plurality of parts of the first data partition is associated with a unique multi-part identifier.

20. The non-transitory computer-readable storage device of claim 19, wherein the plurality of parts of the first data partition are assembled based on the unique multi-part identifier associated with each of the plurality of parts.

\* \* \* \* \*